Aug. 16, 1927.

H. W. VAN LEIR 1,639,240

INSULATING FLEXIBLE SHAFT COUPLING

Filed Jan. 27, 1927    3 Sheets-Sheet 1

WITNESS
F. J. Hartman

INVENTOR
Henry W. Van Leir
BY
Alston B. Moulton
ATTORNEY

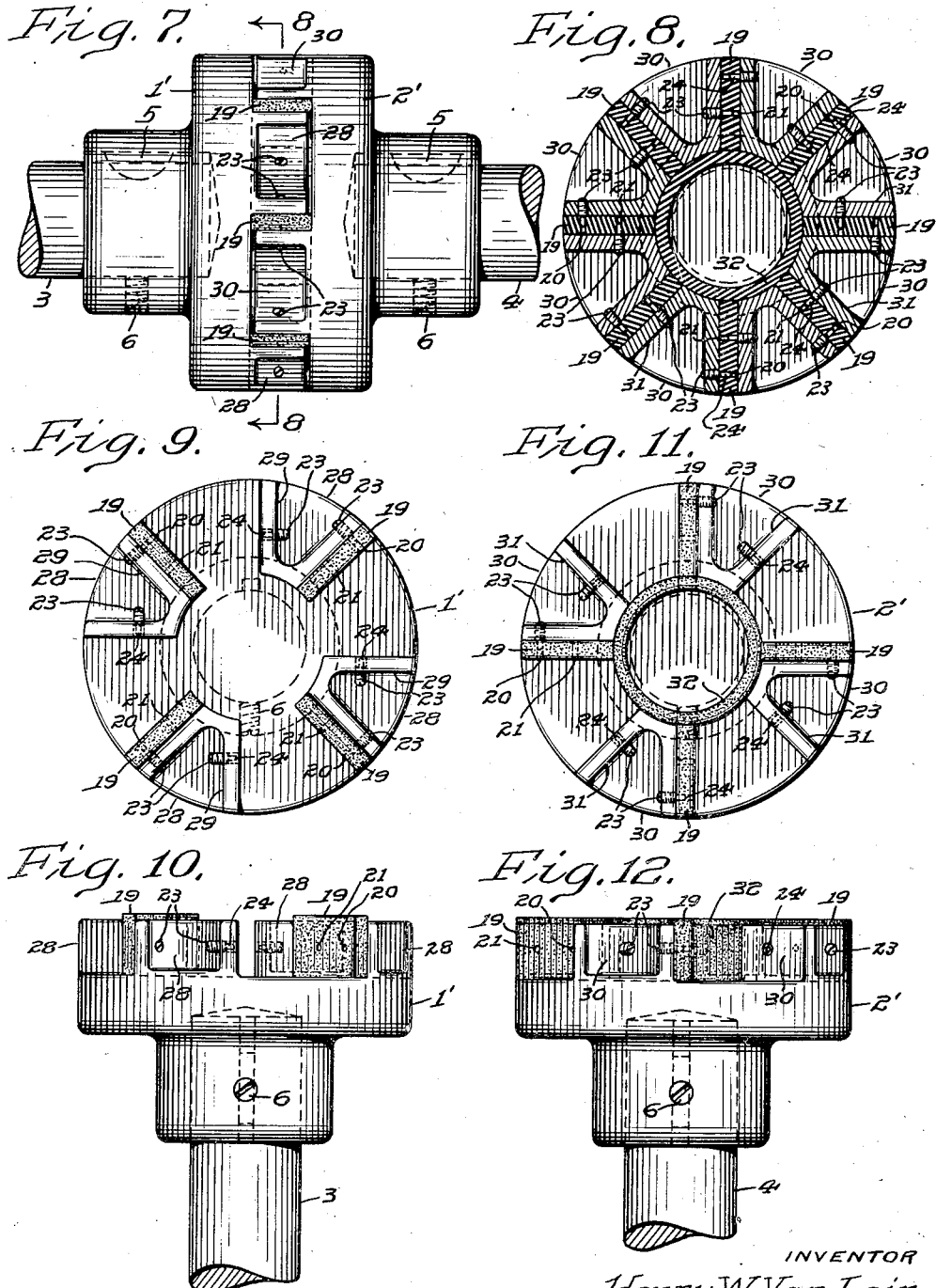

Aug. 16, 1927.
H. W. VAN LEIR
1,639,240
INSULATING FLEXIBLE SHAFT COUPLING
Filed Jan. 27, 1927
3 Sheets-Sheet 3
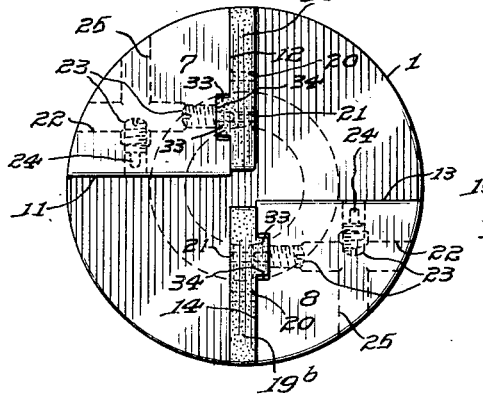
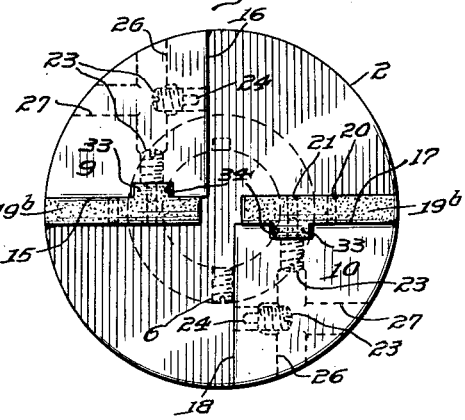
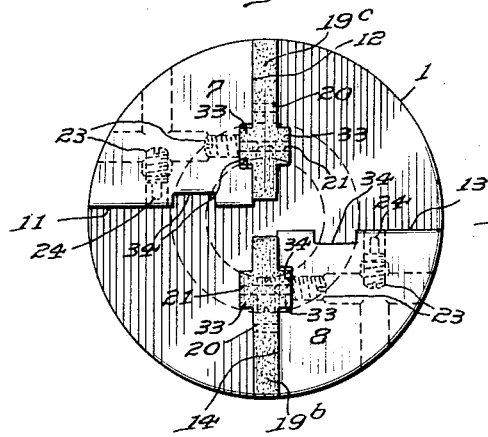
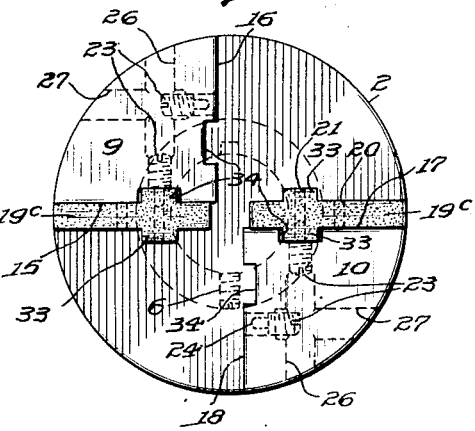
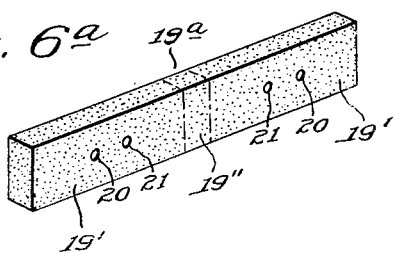
INVENTOR
Henry W. Van Leir.
WITNESS
BY
ATTORNEY Patented Aug. 16, 1927.

1,639,240

UNITED STATES PATENT OFFICE.

HENRY W. VAN LEIR, OF PHILADELPHIA, PENNSYLVANIA.

INSULATING FLEXIBLE SHAFT COUPLINGS.

Application filed January 27, 1927. Serial No. 163,875.

My invention relates to shaft couplings for flexibly connecting together the adjacent ends of two substantially alined shafts for the transmission of power from one shaft to the other and more particularly to those flexible shaft couplings wherein the two shafts connected thereby are electrically insulated from each other.

One of the objects of my invention is to provide a flexible coupling which will positively and effectively transmit rotary motion from one shaft to another without noise or perceptible lost motion even though the shafts be slightly out of alinement with each other.

A further object of my invention is to provide a flexible shaft coupling in which the non-metallic power transmission compression members interposed between the metallic driving heads of the coupling may be withdrawn or removed from the coupling without disconnecting the coupling heads from either shaft or disturbing the other power transmission members.

A further object of my invention is to provide a flexible shaft coupling wherein the parts, when assembled, are interlocked so as to provide a unitary structure with the parts held in fixed relation with respect to each other, making it unnecessary to ship the parts separately to be assembled when the coupling is being installed.

A further object of my invention is to provide a flexible shaft coupling having a plurality of non-metallic compression or power transmission members which are all alike as to size, shape and material so that they may be placed in any of the several places within the coupling and may be secured in place for the transmission of power therethrough and so that duplicates may be readily provided for substitution for worn parts after a coupling has been used for a time.

A further object of my invention is to provide a flexible shaft coupling wherein the non-metallic compression members are disposed substantially radially to the axes of the shafts and from which position they may be readily withdrawn when desired.

A further object of my invention is to so construct, arrange and dispose the non-metallic compression members within the coupling that the said parts are not subjected to any torsional or shearing stresses or to any substantial sliding action but only to a compressive stress transmitted directly through the material of the compression members from the driving head to the driven coupling head.

A further object of my invention is to so construct the power transmitting compression members so that they also operate to prevent any electrical contact or engagement of the two coupling heads or the shaft on which they are mounted.

A further object of my invention is to provide a simple structure with accessible parts, easy to assemble, readily kept in efficient condition with the non-metallic members each locked or secured to one or both coupling heads as desired in such a manner that the said parts may be readily separated and removed from the coupling for replacement and adjustment purposes.

Other objects of my invention will appear in the specification and claims below.

In the drawings forming a part of this specification and in which the same reference characters are employed throughout the various views to designate the same parts, Fig. 1 is a side elevational view of a shaft coupling embodying my invention.

Fig. 6a is a perspective view of a modified form of power transmitting or compression member.

Fig. 7 is a side elevational view of a larger coupling embodying my invention and provided with a larger number of driving lugs or projections than are shown in the construction illustrated in Fig. 1.

Fig. 8 is a transverse cross-sectional view on the line 8—8 of Fig. 7.

Fig. 9 is an elevational view of the face of one of the coupling heads shown in Fig. 7, and Fig. 10 is a side elevational view of the same.

Fig. 11 is an elevational view of the face of the other coupling head of the construction shown in Fig. 7, and Fig. 12 is a side elevational view of the same.

Figs. 13 and 14 are face views of two cooperating coupling heads provided with power transmission members of different construction than that shown in the preceding figures.

Figs. 15 and 16 are the front face elevational views of two coupling heads or members being provided with another type of power transmission or compression members.

Figure 1:
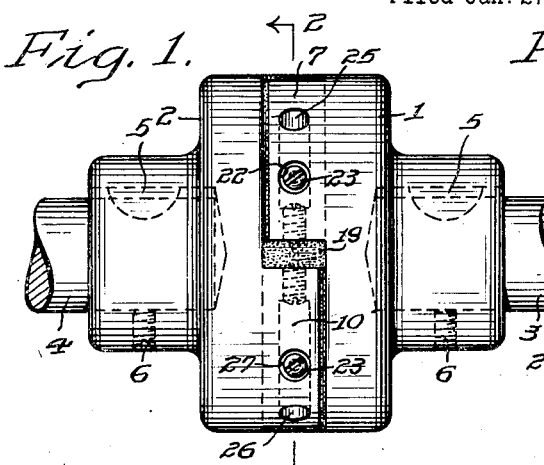
Figure 2:
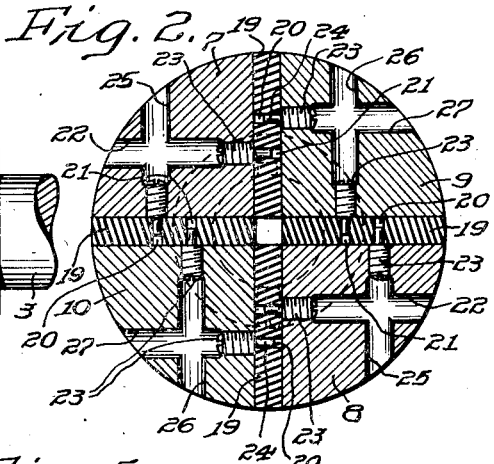
Fig. 2 is a transverse sectional view of the same, taken on the line 2—2 of Fig. 1.

Referring first to the construction illustrated in Figs. 1 to 6 inclusive, my improved flexible coupling is shown as comprising two coupling heads 1 and 2 respectively, each mounted on the end of shafts 3, 4 respectively. Each head is preferably secured to its shaft by a key and spline connection 5, 5 to prevent relative rotary movement of the heads with respect to the shafts and with set screws 6, 6 to prevent longitudinal movement of the coupling heads with respect to the shafts. The face of the coupling head 1 is provided with two diametrically disposed segmental projections or lugs 7, 8, and the head 2 is also similarly provided on its face with like projections 9, 10 all of the same size and shape on the faces of both heads 1 and 2. The sides 11, 12 of the projection 7 are disposed in planes normal to the face of the coupling head and at right angles to each other and extend parallel to lines drawn radially from the axis of rotation of the coupling head 1. The sides or edges 11, 12 are offset slightly from the diameter of the shaft with which they are parallel. The sides or edges 13 and 14 of the projection 8 of the head 1 respectively lie in planes parallel to the sides or edges 11 and 12, of the projection 7, and since these projections 7 and 8 are symmetrically disposed with respect to the axis of the head 1, the planes of the edges 12 and 14 are equally spaced from each other on opposite sides of the diameter of the head with which they are parallel. The sides or edges 11, 13 are similarly spaced with respect to each other and to the diameter of the head to which they are parallel. The projections 9, 10 of the head 2 are positioned on the face of the head 2 exactly as are the projections 7, 8 on the head 1 so that the side or edge 15 of projection 9 is slightly offset from but is parallel to the edge 17 of projection 10 and the edge or face 16 of projection 9 is parallel to but offset from the edge 18 of projection 10.

Figure 3:
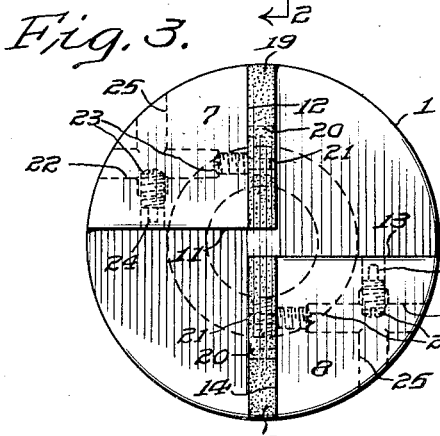
Fig. 3 is an elevational view of the face of one coupling head shown in Fig. 1.
Figure 4:
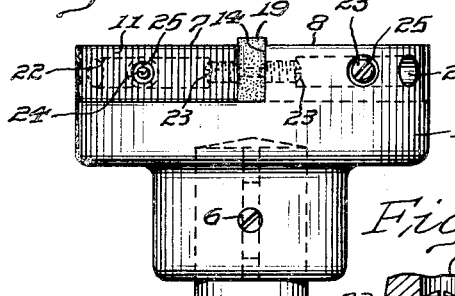
Fig. 4 is a side elevational view of the same.

In Fig. 3 I have shown the face of the head 1 as provided with two flat compression members 19, 19 of non-metallic insulating material which respectively fit flat against the faces or edges 12 and 14 of the lugs or projections 7, 8 respectively to form power transmission or compression members and, as is clearly shown in Figs. 1 and 4, these strips 19, 19 are preferably a little wider than the sides or edges 12, 14 of the lugs 7 and 8 respectively, and are of the same thickness. Each strip 19 is preferably provided with two small holes 20 and 21 respectively midway between the side edges thereof and preferably equally spaced from the ends of the strip. The lug 7 is provided with a hole 22 extending preferably in a direction normal to the side 12, screwthreaded at its inner or lower end to receive a screw 23 having a tip 24 adapted to enter the hole 21 in the strip 19, that is to say, the hole nearest the center or axis of the head. The lug 8 is also provided with a similar hole 22 screwthreaded at its inner end to receive a screw 23, the smaller end 24 of which enters the inner hole 21 of the other strip or compression member 19. The lugs or projections 7 and 8 are also provided each with a hole 23 extending at right angles to the sides 11 and 13 respectively, threaded at its inner end to receive another screw 23 having a reduced tip 24 adapted to register with the outer holes 20 of the strips 19 to be fitted against said edges 11, 13 of the lugs 7, 8 respectively and shown in position on the head 2.

Figure 5:
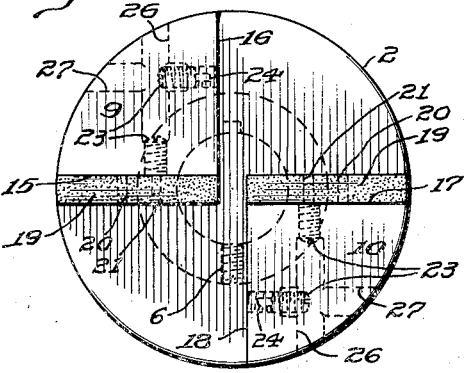
Fig. 5 is a front view of the face of the other coupling head.

In the lugs 9, 10 of head 2 are likewise provided holes 26, 26 like the holes 25, 25 of head 1 to receive screws 23 with tips 24 to enter and fit within the inner holes of the strips 19 shown on head 2 in Fig. 5 and with holes 27 at right angles thereto, similarly threaded on their inner ends to receive like screws 23, the tips 24 of which fit into the outer holes of the pieces 19 now shown in Fig. 3.

The two coupling heads 1 and 2 thus described, may be readily made into a unitary structure by turning them face to face and inserting the lugs 9, 10 with the strips 19 thereon, as shown in Fig. 5 into the spaces between the lugs 7, 8 of head 1. So positioned and arranged it is now only necessary to insert a screwdriver into the holes 25 of head 1 and 27 of head 2 and drive the screws 23 forwardly until the tips 24 enter the outer holes 20 in the power transmission members 19. In this way, each strip 19 is pinned by screws 23 to two lugs or projections, one on opposite sides of each strip so that when the ends or tips 24 within the holes 20, 21 of the strips 19, the whole structure is held inseparably together. Since the widths of the strip 19 is slightly greater than the height of the sides or edges of the projections 7, 8, 9, 10, the end of each lug will be spaced from and held out of contact with the bottom of the recesses between adjacent lugs or projections of the other head, and the heads will be electrically insulated from each other. Since the two heads may be unitarily secured together by merely screwing four screws down in the bottoms of their holes, it follows that the two heads when so assembled together may be as readily similarly separated by merely fastening four of the eight screws which enter the strips 19 forming the compression members.

But it is not necessary to first position the strips 19 on one, the other or both of the heads to assemble the structure. The heads may be brought into the adjacent relationship illustrated in Fig. 1 and then a strip 19 may be radially inserted into the space between each two adjacent lugs on the face of the heads. When the outer end of the strips 19 are flush with the periphery of the heads, the holes 20, 21 will be in alinement with their respective screws 23 and then the screw 23 may be driven inwardly to insert the tips 24 thereof into the holes 20 and 21 of the strips. In this way the four strips will be each interlocked with two lugs, one on each head, and the heads will be securely held together as a unit.

It is advisable to first loosen or insert the screws which are located in the deeper of the two holes in each lug for if the screw in the bottom of a more shallow hole were first moved outwardly it might protrude into the deeper hole where it crosses the shallower and prevent the insertion of the screwdriver into the deeper hole.

Figure 6:
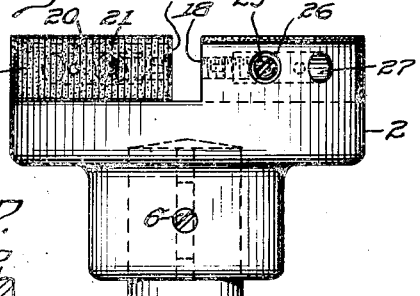
Fig. 6 is a side elevational view of the same.
Figure 17:
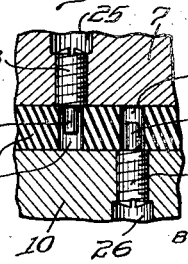
Fig. 17 is a cross-sectional view on a larger scale showing the clearances between the ends of the screws and the compression members whereby said members are capable of slight movements with respect to the heads.

For the reasons above outlined I prefer to make the compression members all alike so that they may be interchangeably inserted and secured between any pair of coacting lugs of the heads. In the smaller couplings, however, such as are illustrated in Fig. 1 of the drawings, one of the strips may be as long as the diameter of the head, that is to say, substantially two strips 19 in one. This modification is shown in Fig. 6ª wherein the strip 19ª may be considered as comprising two compression members 19′ each with its holes 20 and 21 and united by an integral section 19″. The utility of this construction is in the alining of the holes 20 and 21 of the compression members with the screws or pins coacting therewith. After this long compression member 19ª has been inserted between two pairs of lugs it may be shifted slightly longitudinally to bring the holes 20, 21 therein into registration with the ends 24 of the screws 23. Thereafter the short sections 19 may be inserted and pushed squarely up against the intermediate section 19″, in which position the holes 20, 21 therein will be in alinement with their respective screws.

It will now be plain that where shafting is being set up, the coupling as a whole may be placed on the end of one length of shafting and then the other length of shafting may be put in place and slipped into the remaining open end of the coupling without necessitating the separation of the coupling heads. Where the shafting is already in position it may be necessary to separate the coupling by merely loosening four of the screws 23. One coupling head may then be positioned on the end of one shaft and the other coupling head on the other shaft and then the loosened screws may be reinserted to hold the compression member 19 in position.

By making the coupling in such a manner that it may be shipped from the factory in an assembled condition, I may substantially entirely remove the liability of the loss of essential parts in shipment.

In Figs. 7 to 12, I have similarly illustrated a flexible coupling of larger size and adapted for heavier constructions, each head being provided with four instead of two driving projections or lugs.

In this construction, the head 1′ is provided with four like lugs or projections 28 preferably recessed as at 29 to give access to the heads of the screws 23 arranged and disposed substantially as they are in the lugs 7, 8, 9, 10 of the coupling first above described; that is to say, each lug has a screw 23 arranged on one side thereof to be alined with the inner of the two holes 20, 21 with which each power transmitting member 19 is provided, and on its other side with another screw 23 in alinement with the outer hole or opening 20 in the strip 19 adjacent the face thereof. The other head 2′ is similarly provided with a like series of like spaced projections 30, each recessed as at 31 to give access to screws 23 one on each side of each lug and respectively in alinement with the outer and inner holes 20 and 21 respectively in adjacent strips or power transmission members 19. To facilitate the positioning of the strips 19 between the sides of adjacent lugs 28, 30 of the coupling heads 1′ and 2′ when assembling the same, I preferably provide a ring 32 of insulating material which fits against the inner sides of the lugs 28 and 30. When the inner end of a member 19 abuts against the ring 32, the holes 20 and 21 will be in registration with their respective screws 23.

As in the construction just above described, by loosening one series of screws 23 around a coupling head, as, for instance, the screws engaging the outer series of holes 20 in the strips 19, an assembled coupling may be readily separated, and, conversely, the two heads so separated may be assembled by merely replacing or resetting a single series of screws. In this construction also, a worn or compressed power transmission member 19 may be readily removed from the coupling by loosening both screws 23 and withdrawing the tops 24 passing therethrough, and a new compression strip as readily substituted therefor without disturbing the assembly of the device.

In Figs. 13 and 14 is illustrated a further modification of the invention. The power of transmission members 19$^b$ are each provided in this case with an integral or unitary lateral projection 33 adapted to seat in a recess 34 in one side of the lugs or projections 7, 8, 9, 10 on the faces of the heads 1, 2. In other respects the construction may be identical with that shown in Figs. 1 to 6.

In this construction it is to be noted that the strips 19$^b$ are not radially removable from between adjacent lugs. To remove them, the set screws 6 will have to be loosened to free the coupling heads 1 and 2 from their respective shafts. The heads must be separated along the axis of the shafts in order to remove a strip or compression member 19$^b$ and replace it with a new one.

In Figs. 15 and 16, is shown a further modification of my invention wherein both sides of both lugs 7, 8, 9, 10 on both coupling heads 1 and 2 are provided with recesses 34 to receive projections 33 arranged on opposite sides of the strips 19$^c$. In both embodiments of my invention, as illustrated in Figs. 13 to 16, the function of the screws 23 is not to prevent the radial displacement of the compression members under working conditions. The projections 33 extending into the corresponding recesses 34 in the lugs restrain that movement. The screws 23 are employed, however, to interlock the head to provide a unitary assembled structure. If for any reason it be found desirable to ship the shaft couplings shown in Figs. 13 to 16 in un-assembled condition, the screws and the holes into which they are fitted may be omitted, for the projections 33 will serve to prevent the power transmission or compression members 19$^b$ and 19$^c$ from being thrown radially out of the coupling so long as the compression members are in proper condition.

The compression members employed in all the couplings above described may be of any suitable non-metallic material, such as leather, fiber, vulcanized rubber or layers of suitable fabric united by suitable binding material, such as bakelite or vulcanized rubber. The latter material is, however, the one preferred by me because of its durability, its insulating properties and its high resistance to permanent compression, as well as to its quality of deadening or silencing any noise due to intermittent contact of metal therewith. Because of the simplicity and plainness in the construction of the power transmission members, they may be readily made of a variety of materials and of uniform size and shape so as to form parts of the shaft coupling which are perfectly interchangeable and replaceable.

It is to be understood that the flexible couplings above described and embodying my invention are particularly useful in coupling lengths of shafts wherein the alinement of the two sections is substantial but not perfect. In many installations it is practically impossible to secure a perfect alinement of the shafts without care, trouble and expense, and my shaft coupling is particularly designed with that object in view. It is, therefore, to be understood that the compression or power transmissions members 19, 19$^a$, 19$^b$, 19$^c$, are not immovably mounted with respect to the heads. Where screws or pins are employed projecting from the lug into an opening 20 or 21 in the power transmitting members, the said openings are slightly larger than the ends 24 of the screws or pins so that there may be a slight movement of the power transmission member with respect to the sides of the lugs between which it is located. And similarly, when the compression members are provided with lateral projections 33 fitting into recesses 34 in the lugs, the lugs or projections 33 fit loosely in the recesses so that the compression members may slide slightly with respect to the lugs. In this way power may be efficiently transmitted from one shaft to another even when the shafts are slightly out of alinement without perceptible noise, rattle, or lost motion.

In all of the embodiments of my invention above described, the two coacting coupling heads are each provided with a like series of driving lugs projecting from the face of each head and extending substantially parallel to the axis of the head or coupling; each lug on one head is located in the assembled structure in the space or recess between two consecutive lugs on the other head; the adjacent sides of coacting lugs are parallel to each other and to a plane coincident to the axis of the rotation of the coupling or head, and the space between said lugs is disposed substantially radially to the axis of the couplings; and the screws which serve to hold the power transmission members or strips in position and the coupling together as a unit are all accessible from the periphery or outer side of the coupling.

It is also to be observed that each strip is held in place by two screws, one projecting into the strip toward each of the lugs contacting therewith and that when so assembled the heads are secured together as a unit construction. In Figs. 1 to 12 any strip may be inserted into and withdrawn from the space between coacting lugs when the screws are withdrawn without disturbing the connection between the heads and the other strips. In all of the embodiments of my invention above described, except that shown in Fig. 6ª, all of the strips in any one coupling may be alike as to size and shape so that any strip may be positioned between any two of the coacting driving lugs.

Having thus described my invention, what I claim and desire to protect by Letters Patent of the United States is:

1. In a flexible coupling, the combination with two like coupling heads arranged complemental to each other, each with an axial opening therein to receive an end respectively of one of two substantially alined shafts, the adjacent faces of said heads being each provided with a series of spaced driving lugs, each lug on the face of one of said heads being located in the space between two consecutive lugs on the face of the other head, the adjacent sides of coacting lugs being parallel to each other and to a plane coincident with the axes of said heads, strips of substantially incompressible insulating material fitting into the spaces between each pair of coacting lugs, and removable means to secure each of said strips to the driving lugs in contact therewith on opposite sides thereof to secure said heads together as a unit construction.

2. In a flexible coupling, the combination of two coupling heads arranged complemental to each other and in substantial axial alinement with each other, the adjacent faces of said heads being each provided with a series of equally spaced driving lugs, the lugs on the face of one of said heads being in the space between two consecutive lugs on the face of the other of said heads, the adjacent sides of coacting lugs being parallel to each other and extending substantially radially from the axis of said heads, strips of substantially incompressible insulating material fitting the spaces between each pair of coacting lugs, and removable means projecting from the sides of each lug into the strips in contact therewith to prevent the separation of said heads from each other.

3. In a flexible coupling, the combination of two coupling heads, the adjacent faces of which are provided with like series of spaced driving lugs extending substantially parallel to the axes of rotation of said heads, the lugs on the face of one of said heads being each located in the space between two consecutive lugs on the face of the other of said heads and the end of said lugs on each head being spaced from the other head, the adjacent sides of coacting lugs being parallel to each other and extending substantially radially from the axes of said heads, parallel sided strips of insulating material fitting between each pair of coacting lugs, and removable means in each lug extending into each strip in contact therewith and loosely holding said strip in position between said lugs.

4. In a flexible coupling, the combination of two coupling heads, the adjacent faces of which are provided with a series of spaced like driving lugs, each lug on one head being in the space between two consecutive lugs on the other head, the adjacent sides of each pair of coacting lugs being spaced from each other and disposed parallel to a plane coincident with the axis of said heads, parallel sided strips of substantially incompressible insulating material fitting the space between the adjacent faces of each pair of coacting lugs, and means accessible from the periphery of said heads to loosely attach each strip to both lugs contacting therewith.

5. In a flexible coupling, the combination of two coupling heads, the adjacent faces of which are provided each with a circular series of spaced like driving lugs, each lug on one head being in the space between two consecutive lugs on the other head, the adjacent sides of each pair of coacting lugs being spaced from each other and disposed parallel to a plane coincident with the axes of said heads, parallel sided strips of substantially incompressible insulating material between each pair of coacting lugs, and a screw projecting from each side of each lug into the strip contacting therewith to loosely retain said strips in position, each screw being accessible from the periphery of said head for insertion and withdrawal, and each strip being radially removable from and insertable into the space between said lugs when said screws are withdrawn.

6. In a flexible coupling, the combination of two alined coupling heads adapted to be respectively secured to the ends of substantially alined shafts, each head having on the face thereof a circular series of like projecting lugs providing like recesses between said lugs, each lug on one head projecting between a recess between two consecutive lugs on the other head but out of contact with the bottom of said recess, like parallel sided strips of substantially incompressible insulating material fitting between the sides of each pair of coacting lugs and wider than the sides of the lugs in contact therewith and extending from the bottom of the recess on one head to the bottom recess on the other head, and removable means to secure each strip to both lugs in engagement therewith and to prevent the separation of said heads.

7. In a flexible coupling, the combination of two coupling heads, the adjacent faces of which are provided with like series of spaced driving lugs extending substantially parallel to the axis of rotation of said heads, the lugs on the face of one of said heads being each located in the space between two consecutive lugs on the face of the other of said heads and the sides of coacting lugs being spaced from and parallel to each other, parallel sided strips of insulating material fitting between each pair of coacting lugs, the width of each strip being slightly greater than the height of the lugs coacting therewith whereby the end of each lug is maintained spaced from the bottom of the recess within which it is, and a screw projecting from each side of each lug into the strips contacting therewith, said screws being accessible for insertion or withdrawal from the outside of the coupling.

8. In a flexible coupling, the combination of two coupling heads, the adjacent faces of which are provided with a circular series of spaced driving lugs extending substantially parallel to the axes of rotation of said heads, the lugs on the face of one of said heads being each located between the spaces between two consecutive lugs on the face of the other of said heads, the adjacent sides of coacting lugs being parallel to each other and extending substantially radially from the axis of said heads, parallel sided strips of insulating material, each insertable into and withdrawable from between the space between two adjacent lugs and removable means in each lug extending into each strip in contact therewith to loosely retain said strips in position between said lugs.

In witness whereof, I have hereunto set my hand this 26th day of January, 1927.

HENRY W. VAN LEIR.